United States Patent
Herman et al.

(10) Patent No.: US 12,287,629 B2
(45) Date of Patent: Apr. 29, 2025

(54) DETECTION OF AUTONOMOUS OPERATION OF A VEHICLE

(71) Applicant: Ford Global Technologies, LLC, Dearborn, MI (US)

(72) Inventors: David Michael Herman, West Bloomfield, MI (US); Alexander George Shanku, Grosse Pointe Park, MI (US); Yashanshu Jain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 17/819,430

(22) Filed: Aug. 12, 2022

(65) Prior Publication Data

US 2024/0053747 A1    Feb. 15, 2024

(51) Int. Cl.
*G05D 1/00* (2024.01)
*B60W 40/08* (2012.01)
*B60W 50/14* (2020.01)

(52) U.S. Cl.
CPC .......... *G05D 1/0088* (2013.01); *B60W 40/08* (2013.01); *B60W 50/14* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 10,059,175 B2* | 8/2018 | Cuddihy | B60J 1/2016 |
| 10,946,864 B2 | 3/2021 | Choi et al. | |
| 11,186,288 B1* | 11/2021 | Chan | B60W 40/08 |
| 11,754,398 B2* | 9/2023 | Ries | B60W 60/001 |
| | | | 701/469 |
| 12,134,400 B2* | 11/2024 | Koehler | B60W 60/001 |
| 2016/0138924 A1* | 5/2016 | An | G01C 21/34 |
| | | | 701/25 |
| 2017/0344004 A1* | 11/2017 | Foster | G05D 1/0212 |
| 2018/0053102 A1 | 2/2018 | Martinson et al. | |
| 2019/0011914 A1* | 1/2019 | Park | B60W 40/09 |

(Continued)

FOREIGN PATENT DOCUMENTS

KR   20170139885 A1 * 12/2017
KR   20190005630 A  *  1/2019

(Continued)

OTHER PUBLICATIONS

"Making Knowledge Visible," EMDE Grafik, 2019, 2 pages.

(Continued)

*Primary Examiner* — Justin S Lee
(74) *Attorney, Agent, or Firm* — Frank Lollo; Brooks Kushman P.C.

(57) ABSTRACT

A computer includes a processor and a memory, and the memory stores instructions executable by the processor to receive operation data generated by first components of a vehicle; determine that the vehicle is being operated autonomously by an on-board autonomous-operation module based on the operation data without using output from the on-board autonomous-operation module; and upon determining that the vehicle is being operated autonomously, actuate a second component of the vehicle.

20 Claims, 3 Drawing Sheets

(56) References Cited

U.S. PATENT DOCUMENTS

| | | | | |
|---|---|---|---|---|
| 2019/0107403 | A1* | 4/2019 | Takeuchi | G01C 21/3461 |
| 2020/0174470 | A1* | 6/2020 | Park | G08G 1/09685 |
| 2020/0216094 | A1 | 7/2020 | Zhu et al. | |
| 2021/0024087 | A1* | 1/2021 | Kim | B60W 40/09 |
| 2021/0237766 | A1* | 8/2021 | Suzuki | B60W 60/001 |
| 2021/0291870 | A1* | 9/2021 | Hutchings | B60W 40/08 |
| 2022/0169278 | A1* | 6/2022 | Refaat | G06F 18/214 |
| 2022/0221280 | A1* | 7/2022 | Panzer | G01S 17/89 |
| 2023/0005068 | A1* | 1/2023 | Kumar | B60W 50/082 |
| 2024/0034225 | A1* | 2/2024 | Gagliano | B60Q 1/46 |

FOREIGN PATENT DOCUMENTS

| | | | |
|---|---|---|---|
| KR | 102072161 B1 * | 2/2020 | |
| KR | 20210130008 A * | 10/2021 | |
| WO | 2019156915 A1 | 8/2019 | |

OTHER PUBLICATIONS

"Commaai/openpilot," GitHub, Feb. 2022, 5 pages.
"New Sounds." openpilot 0.8.12, Dec. 15, 2021, 5 pages.
Lundkvist, et al., "Continuous Edgeline On Nine Metre Wide Two-Lane Roads," www.trb.org, 2 pages.
"The worldwide standard for map data in automotive eco-systems," Navigation Data Standard, 2021, 7 pages.
Wada, T. et al., "On driver's braking behavior in car following," SICE Annual Conference, 2007, 2 pages.
Wang, J., et al., "Normal Acceleration Behavior of Passenger Vehicles Starting from Rest at All-Way Stop-Controlled Intersections," Transportation Research Record Journal of the Transportation Research Board, Jan. 2004, 13 pages.
"File: Overview building blocks-nds-with-HAD.jpg," Wikimedia Commons, May 2016, 3 pages.

* cited by examiner

DETECTION OF AUTONOMOUS OPERATION OF A VEHICLE

BACKGROUND

Some vehicles are autonomous or semi-autonomous. A computer is programmed to operate the vehicle independently of the intervention of a human operator, completely or to a lesser degree. The computer is programmed to operate a propulsion system, a brake system, a steering system, and/or other vehicle systems. Autonomous operation means the computer controls the propulsion system, brake system, and steering system without input from a human operator; semi-autonomous operation means the computer controls one or two of the propulsion system, brake system, and steering system and a human operator controls the remainder; and nonautonomous operation means a human operator controls the propulsion system, brake system, and steering system.

The vehicle may come equipped from the factory with autonomous operation, or autonomous operation may be added as an aftermarket accessory. As an aftermarket accessory, a new computer with an autonomous-operation module may be connected to the vehicle, or the autonomous-operation module may be installed on a computer that is already on board the vehicle.

DETAILED DESCRIPTION

Figure 1:
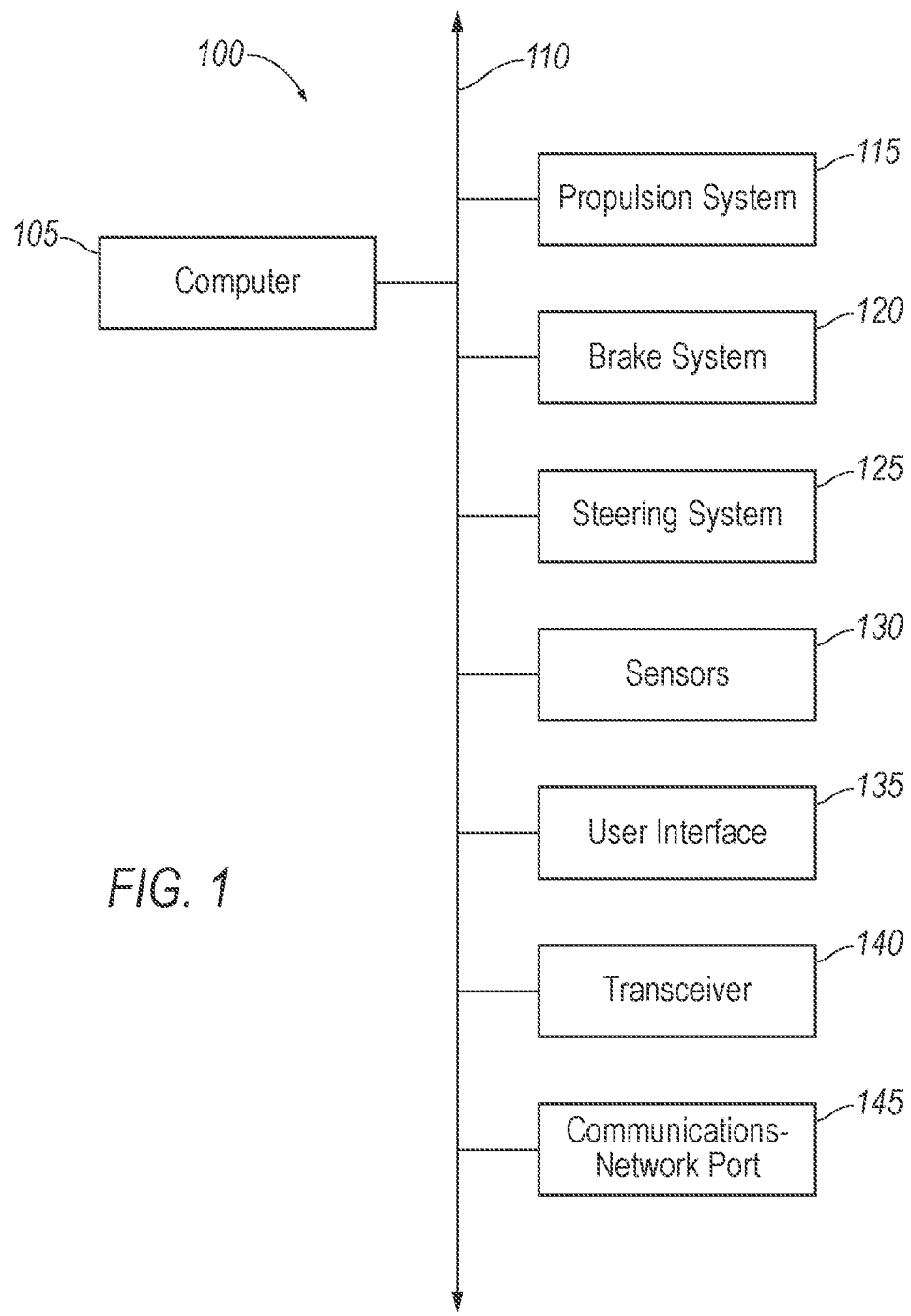
FIG. 1 is a block diagram of an example vehicle.

This disclosure describes techniques for detecting that a vehicle is being operated autonomously, e.g., with an aftermarket autonomous-operation module, and actuating a component upon detecting the autonomous operation. For example, the vehicle may output a message to the operator of the vehicle or inhibit an input stream from the aftermarket autonomous-operation module. A computer on board the vehicle may receive operation data generated by first components of a vehicle and determine that the vehicle is being operated autonomously by an on-board autonomous-operation module based on the operation data without using output from the on-board autonomous-operation module. Upon so determining, the computer actuates a second component of the vehicle. The computer may thereby prevent unauthorized autonomous operation of the vehicle or keep autonomous operation of the vehicle within authorized conditions or parameters.

A computer includes a processor and a memory, and the memory stores instructions executable by the processor to receive operation data generated by first components of a vehicle, determine that the vehicle is being operated autonomously by an on-board autonomous-operation module based on the operation data without using output from the on-board autonomous-operation module, and upon determining that the vehicle is being operated autonomously, actuate a second component of the vehicle.

Determining that the vehicle is being operated autonomously may include executing a machine-learning classifier. The machine-learning classifier may be trained to classify the operation data as one of a plurality of operation classifications, and the operation classifications may include at least one autonomous-operation classification and at least one nonautonomous-operation classification.

The machine-learning classifier may be trained with training data including first operation data generated while operating vehicles using at least one first autonomous-operation module and second operation data generated while nonautonomously operating the vehicles. The first operation data and the second operation data may be generated while operating the vehicles over a same environment.

The training data may include third operation data generated while operating the vehicles using a second autonomous-operation module.

Determining that the vehicle may be being operated autonomously is conditional on determining that a trigger condition is met. The trigger condition may include an indicator of an operator of the vehicle being distracted.

The trigger condition may include a lack of an indicator of an operator being distracted at the same time as the operator providing an input to the vehicle, and providing the input is correlated with the operator being distracted.

The trigger condition may include a first indicator of an operator being distracted and a lack of a second indicator of the operator being distracted.

The trigger condition may include the vehicle being at a preset geographic location.

The trigger condition may include an environmental condition being experienced by the vehicle.

The trigger condition may include a preset response to a prompt to an operator.

The first components may include at least one of a propulsion system, a brake system, or a steering system.

The first components may include at least one sensor that returns data about an external environment around the vehicle.

The operation data may include data transmitted over a communications network of the vehicle.

Actuating the second component may include instructing a user interface to output a message to an operator of the vehicle.

Actuating the second component may include inhibiting an input stream from the on-board autonomous-operation module.

Actuating the second component may include instructing a transceiver to transmit the operation data to a remote server.

A method includes receiving operation data generated by first components of a vehicle, determining that the vehicle is being operated autonomously by an on-board autonomous-operation module based on the operation data without using output from the on-board autonomous-operation module, and upon determining that the vehicle is being operated autonomously, actuating a second component of the vehicle.

With reference to the Figures, wherein like numerals indicate like parts throughout the several views, a computer 105 includes a processor and a memory, and the memory stores instructions executable by the processor to receive operation data 205 generated by first components of a vehicle 100; determine that the vehicle 100 is being operated autonomously by an on-board autonomous-operation module based on the operation data 205 without using output from the on-board autonomous-operation module; and upon determining that the vehicle 100 is being operated autonomously, actuate a second component of the vehicle 100.

With reference to FIG. 1, the vehicle 100 may be any passenger or commercial automobile such as a car, a truck, a sport utility vehicle, a crossover, a van, a minivan, a taxi, a bus, a jeepney, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to a propulsion system 115, a brake system 120, a steering system 125, sensors 130, a user interface 135, a transceiver 140, a communications-network port 145, and other components via the communications network 110.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator, or from the on-board autonomous-operation module if present. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator, or from the on-board autonomous-operation module if present. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator, or from the on-board autonomous-operation module if present. The human operator may control the steering system 125 via, e.g., a steering wheel.

The sensors 130 may provide data about operation of the vehicle 100, for example, wheel speed, wheel orientation, and engine and transmission data (e.g., temperature, fuel consumption, etc.). The sensors 130 may detect the location and/or orientation of the vehicle 100. For example, the sensors 130 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 130 may provide data about the operator and/or other occupants of the vehicle 100, e.g., a camera aimed at the operator, a capacitive sensor mounted on the steering wheel, a torque sensor coupled to the steering wheel, etc. The sensors 130 may detect the external world, e.g., objects and/or characteristics of surroundings of the vehicle 100, such as other vehicles, road lane markings, traffic lights and/or signs, pedestrians, etc. For example, the sensors 130 may include radar sensors, ultrasonic sensors, scanning laser range finders, light detection and ranging (lidar) devices, and image processing sensors such as cameras.

The user interface 135 presents information to and receives information from an operator of the vehicle 100. The user interface 135 may be located, e.g., on an instrument panel in a passenger cabin of the vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

The transceiver 140 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 140 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, a fleet manager, etc. The transceiver 140 may be one device or may include a separate transmitter and receiver.

The communications-network port 145 allows an external device to be directly connected to, e.g., plugged into, the communications network 110. The type of the communications-network port 145 can be any suitable port for a physical, i.e., wired, connection to the communications network 110 and typically depends on the type of the communications network 110. For example, if the communications network 110 includes a CAN bus, the communications-network port 145 may be a 9-pin D-sub female connector to connect to the CAN bus of the communications network 110. For another example, if the communications network 110 includes an OBD-II, the communications-network port 145 may be a 16-pin D-shaped female connector to connect to the OBD-II of the communications network 110.

Figure 2:
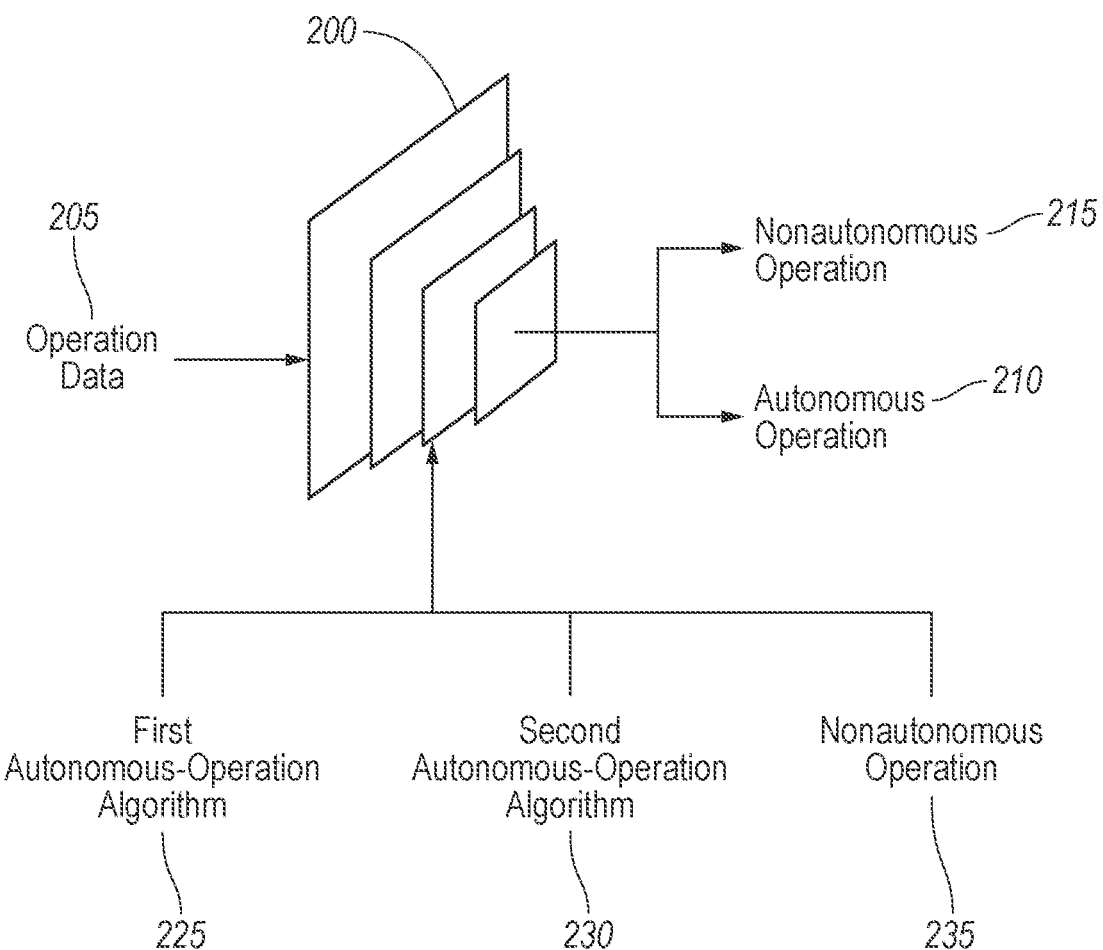
FIG. 2 is a diagram of an example machine-learning classifier for determining whether the vehicle is being operated autonomously.

With reference to FIG. 2, the computer 105 is programmed to receive the operation data 205 generated by first components of the vehicle 100. For the purposes of this disclosure, "operation data" is defined as data indicating motion of the vehicle 100 or a relationship of the vehicle 100 to an external environment. For example, the first components may include at least one of the propulsion system 115, the brake system 120, or the steering system 125, and the operation data 205 generated by those first components may include acceleration data, steering-wheel angle, steering angle, braking force, etc. For another example, the first components may include at least one of the sensors 130 that returns data about an external environment around the vehicle 100, e.g., a radar, a camera, a lidar, an ultrasonic sensor, etc., and the operation data 205 generated by the sensor 130 may include point clouds, image data, etc., and/or values determined therefrom such as a following distance to a vehicle in front of the vehicle 100, a lateral position of the vehicle 100 within a lane, etc. For another example, the operation data 205 may include data transmitted over the communications network 110, e.g., the CAN bus of the communications network 110, e.g., the foregoing data from the propulsion system 115, the brake system 120, the steering system 125, and the sensors 130. For another example, the operation data 205 may include V2X data received by the transceiver 140, e.g., data from an outside sensor that has detected the vehicle 100.

The vehicle 100 may or may not include an on-board autonomous-operation module. The on-board autonomous-operation module is programmed to operate the vehicle 100 independently of the intervention of a human operator, completely or to a lesser degree. The on-board autonomous-operation module may be programmed to operate the propulsion system 115, the brake system 120, the steering system 125, and/or other vehicle systems. For the purposes of this disclosure, fully autonomous operation means the on-board autonomous-operation module controls the propulsion system 115, brake system 120, and steering system 125 without input from a human operator; semi-autonomous operation means the on-board autonomous-operation module controls one or two of the propulsion system 115, brake system 120, and steering system 125 and a human operator controls the remainder; and nonautonomous operation means a human operator controls the propulsion system 115, brake system 120, and steering system 125. Autonomous operation includes fully autonomous and semi-autonomous operation. Alternatively or additionally, the on-board autonomous-operation module may achieve autonomous operation by altering inputs or outputs of a preinstalled autonomous-operation module, e.g., of an autonomous-operation module installed by a manufacturer of the vehicle 100.

The on-board autonomous-operation module may be an aftermarket addition to the vehicle 100. For example, the on-board autonomous-operation module may be installed on the computer 105 after the vehicle 100 has been sold by the manufacturer. For another example, the on-board autonomous-operation module may be installed on an external device that is connected to the communications network 110 after the vehicle 100 has been sold by the manufacturer. The external device may, e.g., plug into the communications-network port 145 (e.g., an OBD-II dongle) or connect wirelessly to the communications network 110 via the transceiver 140. As a consequence of the on-board autonomous-operation module being aftermarket, the computer 105 may not receive or recognize output from the on-board autonomous-operation module. For example, messages sent by the on-board autonomous-operation module may be addressed to the components being actuated and not to the computer 105. In another example, the on-board autonomous-operation module may directly spoof or fake user and/or sensor input, through network connection or otherwise, in order to achieve some resulting behavior of the vehicle components.

The computer 105 is programmed to determine whether the vehicle 100 is being operated autonomously by the on-board autonomous-operation module based on the operation data 205 without using output from the on-board autonomous-operation module. There are differences between how a human operates the vehicle 100 and how the on-board autonomous-operation module operates the vehicle 100, and the computer 105 may search the operation data 205 for data matching how the on-board autonomous-operation module operates the vehicle 100. For example, the computer 105 may analyze following distance, i.e., the distance from the vehicle 100 to another vehicle in front of the vehicle 100. The on-board autonomous-operation module may have a steady-state following distance that increases linearly with a speed of the vehicle 100, and a human operator may typically exhibit a nonlinear relationship between the steady-state following distance and the speed of the vehicle 100. Other operation data that may include such differences may include a lateral position of the vehicle 100 relative to lane markings, acceleration behavior, braking behavior, etc. These different types of operation data may be analyzed individually or collectively. The computer 105 may analyze the operation data in real-time or may analyze the operation data collected over a most recent preset interval, e.g., the past thirty seconds, which may be recorded in a buffer.

For example, determining whether the vehicle 100 is being operated autonomously may include executing a machine-learning classifier 200. The machine-learning classifier 200 may be any suitable type of machine-learning program for classification, e.g., a convolutional neural network. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; fully connected layers, which generate based on the output of all neurons of the previous layer; and recurrent layers, which operate on the output of later layers. The final layer of the convolutional neural network generates a score for each potential classification, and the final output is the classification with the highest score.

The machine-learning classifier 200 may be trained to classify the operation data 205 as one of a plurality of operation classifications. The operation classifications include at least one autonomous-operation classification 210 and at least one nonautonomous-operation classification 215. For example, the operation classifications may include a single autonomous-operation classification 210 that encompasses multiple autonomous-operation modules. Alternatively, the operation classifications may include multiple autonomous-operation classifications 210 that each indicate a different autonomous-operation module. For another example, the operation classifications may include a single nonautonomous-operation classification 215. Alternatively, the operation classifications may include multiple nonautonomous-operation classifications 215 that each indicate a different driving style of human operators, e.g., aggressive, cautious, etc.

The machine-learning classifier 200 may be trained using supervised learning, which is preferable because the operation classifications may be known in advance. The machine-learning classifier 200 is trained with training data 220, which includes operation data that is pre-labeled with the known operation classifications. The training data 220 may include operation data generated with each operation classification, e.g., operation data generated while operating vehicles using a first autonomous-operation module 225, operation data generated while operating vehicles using a second autonomous-operation module 230, etc., as well as operation data generated while nonautonomously operating vehicles, i.e., during nonautonomous operation 235 by a human operator. The nonautonomous operation data may be gathered from a population of operators not including the operator of the vehicle 100, e.g., before the vehicle 100 is manufactured and sold, or the nonautonomous operation data may include operation data from the operator of the vehicle 100, e.g., for sending an update for the machine-learning classifier 200. The operation data may be gathered with any suitable test setup, e.g., software-in-the-loop (SIL), processor-in-the-loop (PIL), hardware-in-the-loop (HIL), or real-world driving. The operation data for each operation classification may be generated while operating the vehicles over a same environment. The environment may be a real-world environment for real-world driving or a virtual environment for SIL, PIL, or HIL testing. The same environment may include a same route followed by the vehicles for each operation classification. Using the same environment provides for a more direct comparison between the operation data for different operation classifications.

As other examples, determining whether the vehicle 100 is being operated autonomously may include performing a statistical test, performing Bayesian analysis, performing time-series clustering, etc. The computer 105 may determine whether the operation data is different than nonautonomous operation data with a confidence of at least a threshold, e.g., a standard statistical threshold such as 95%.

The computer 105 may be programmed to continuously or periodically determine whether the vehicle 100 is being operated autonomously. Alternatively or additionally, determining whether the vehicle 100 is being operated autonomously may be conditional on determining that a trigger condition is met. In other words, the computer 105 may be programmed to determine whether the vehicle 100 is being operated autonomously in response to a trigger condition being met. For the purposes of this disclosure, a "trigger condition" is defined as a criterion or set of criteria that may or may not be satisfied at any given time. Examples are discussed in turn below. The computer 105 may be programmed with multiple criteria, and determining whether the trigger condition is met may include determining whether at least one of the criteria is satisfied. The trigger condition being met can indicate conditions that suggest that the vehicle 100 is being operated autonomously by the on-board autonomous-operation module, or the trigger condition being met can indicate conditions that are more favorable for differentiating autonomous and nonautonomous operation. The trigger condition may save processing time by reducing how frequently the computer 105 determines whether the vehicle 100 is being operated autonomously.

For an example of a trigger condition, the trigger condition may include an indicator of the operator of the vehicle 100 being distracted. For example, the computer 105 may be programmed to determine whether a gaze direction of the operator is aimed forward, e.g., through a front windshield of the vehicle 100, as opposed to sideways or downward toward an instrument panel of the vehicle 100. The computer 105 can, first, detect the eyes using any suitable eye-detection algorithm, e.g., a shape-based technique using an elliptical eye model or a complex eye model; a feature-based technique such as detecting local features, detecting a filter response, or detecting the pupil and iris; an appearance-based technique; hybrid techniques of the foregoing; etc. The computer 105 can then detect the gaze direction of the detected eyes using any suitable gaze-tracking algorithm, e.g., model-based techniques, interpolation-based techniques, appearance-based techniques, visible light-based techniques, etc. The indicator of the operator being distracted may be the gaze direction being outside a preset range, e.g., corresponding to the front windshield. For another example, the computer 105 may be programmed to determine whether the hands of the operator are on the steering wheel, e.g., based on data received from the sensors 130, e.g., a torque sensor coupled to the steering wheel and/or a capacitive sensor on the steering wheel. The indicator of the operator being distracted may be the hands of the operator being off the steering wheel according to one or both of the torque sensor and the capacitive sensor. The computer 105 may also use a combination of techniques such as the foregoing to determine the indicator of the operator being distracted.

For another example of a trigger condition, the trigger condition may include a lack of the indicator of the operator being distracted at the same time as the operator providing an input to the vehicle 100, and providing the input may be correlated with the driver being distracted. For example, providing the input may include pushing a button, turning a dial, touching a touchscreen, etc. of the user interface 135 to provide a non-driving-related input such as changing a radio station. This trigger condition may be met when the operator provides the input at the same time, i.e., simultaneously with, a lack of one of the indicators of the operator being distracted above, e.g., the gaze direction being directed through the front windshield or the capacitive sensor indicating both hands on the steering wheel. If the operator is changing the radio station while the gaze direction is through the front windshield, then the operator may be spoofing the gaze direction, increasing a likelihood that the operator is relying on the on-board autonomous-operation module rather than nonautonomously operating the vehicle 100. Likewise, if the operator is changing the radio station while having both hands on the steering wheel according to the capacitive sensor, then the operator may be spoofing the hands on the steering wheel.

For another example of a trigger condition, the trigger condition may include a first indicator of an operator being distracted and a lack of a second indicator of the operator being distracted, e.g., the gaze direction not being directed through the front windshield while the hands are on the steering wheel, or the hands being off the steering wheel according to the torque sensor and the hands being on the steering wheel according to the capacitive sensor. This trigger condition again suggests that the operator may be spoofing the lack of one of the indicators of the operator being distracted.

For another example of a trigger condition, the trigger condition may include the vehicle 100 being at a preset geographic location. The computer 105 may determine whether the vehicle 100 is at the preset geographic location by comparing a location of the vehicle 100 according to a GPS sensor of the sensors 130 with a geofenced area stored in the memory. The preset geographic location may be chosen based on more easily detecting one or more typical differences between autonomous operation and nonautonomous operation at the preset geographic location. For example, the preset geographic location may include a wide turn, which would facilitate analysis of steering data; or a stretch of road that includes a decrease in posted speed limit, which would facilitate analysis of braking data.

For another example of a trigger condition, the trigger condition may include an environmental condition being experienced by the vehicle 100. The environmental condition may be a weather condition such as rain, fog, etc., or a road condition such as a gravel road. The computer 105 may receive weather data via the transceiver 140. The environmental condition may be chosen based on more easily detecting one or more typical differences between autonomous operation and nonautonomous operation in the environmental condition. For example, a human operator may slow down more in dense fog than an on-board autonomous-operation module does. Alternatively or additionally, the environmental condition may be chosen based on limitations of a preinstalled autonomous-operation module. For example, the preinstalled autonomous-operation module may provide autonomous operation during clear weather but not rainy or snowy weather. The environmental condition may allow the computer 105 to detect an on-board autonomous-operation module that forces the preinstalled autonomous-operation module to perform outside its limitations.

For another example of a trigger condition, the trigger condition may include a preset response to a prompt to the operator. The computer 105 may periodically instruct the user interface 135 to output a prompt to the operator requesting a response. If the operator provides the preset response rather than some other response, then this criterion of the trigger condition is satisfied. For example, the prompt may ask the operator to confirm that the vehicle 100 is being operated nonautonomously, and the preset response may be either a negative reply or a preset duration elapsing without receiving a reply.

The computer 105 may be programmed to, upon determining that the vehicle 100 is being operated autonomously, actuate a second component of the vehicle 100. The second component may be included in the first components from which the operation data 205 is received, or the second component may be different than the first components.

For example, actuating the second component may include instructing the user interface 135 to output a message to an operator of the vehicle 100. The message may indicate that the vehicle 100 is being operated autonomously, e.g., "Autonomous Operation Detected." Alternatively or additionally, the message may order the operator to take full control of the vehicle 100, i.e., to begin operating the vehicle 100 nonautonomously, e.g., "Disengage Autonomous Operation/Take Command of Vehicle." The message may be visual, audible, or both.

For another example, actuating the second component may include inhibiting an input stream responsible for the vehicle 100 being operated autonomously. The computer 105 may disconnect the communications-network port 145 from the communications network 110 or block transmission between the communications-network port 145 and the communications network 110. The computer 105 may instruct the propulsion system 115, the brake system 120, and/or the steering system 125 to only accept commands from a designated sender.

For another example, actuating the second component may include instructing the transceiver 140 to transmit the operation data 205 to a remote server. The remote server may belong to, e.g., a manufacturer or fleet manager of the vehicle 100.

Figure 3:
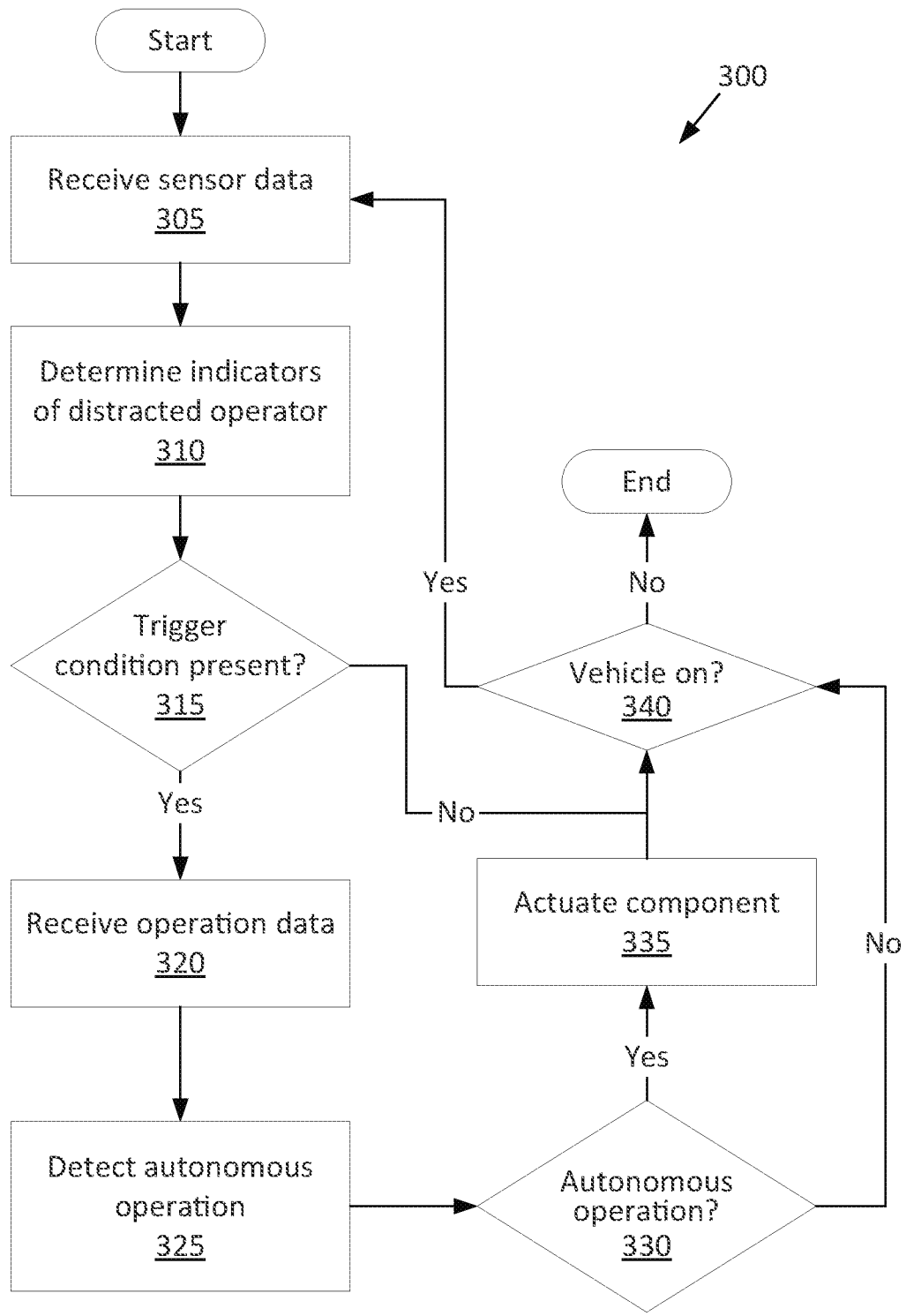
FIG. 3 is a process flow diagram of an example process for determining whether the vehicle is being operated autonomously.

FIG. 3 is a process flow diagram illustrating an example process 300 for determining whether the vehicle 100 is being operated autonomously. The memory of the computer 105 stores executable instructions for performing the steps of the process 300 and/or programming can be implemented in structures such as mentioned above. The process 300 may begin in response to the vehicle 100 being turned on. As a general overview of the process 300, the computer 105 receives the sensor data and determines whether any indicators of the operator being distracted are present. If the trigger condition is met, the computer 105 receives the operation data 205 from the first components and determines whether the vehicle 100 is being operated autonomously. Upon determining that the vehicle 100 is being operated autonomously, the computer 105 actuates the second component. The process 300 continues for as long as the vehicle 100 remains on.

The process 300 begins in a block 305, in which the computer 105 receives data from the sensors 130.

Next, in a block 310, the computer 105 determines whether any indicators of the operator being distracted are present, as described above.

Next, in a decision block 315, the computer 105 determines whether the trigger condition is met. The computer 105 may determine whether any of the criteria of the trigger condition described above are met, e.g., the indicator of the operator being distracted, the lack of the indicator of the operator being distracted at the same time as the operator providing the input, etc. If so, the process 300 proceeds to a block 320. If not, the process 300 proceeds to a decision block 340.

In the block 320, the computer 105 receives the operation data 205 generated by the first components of the vehicle 100, as described above.

Next, in a block 325, the computer 105 determines whether the vehicle 100 is being operated autonomously by the on-board autonomous-operation module based on the operation data 205 without using output from the on-board autonomous-operation module, as described above.

Next, in a decision block 330, the computer 105 determines the output of the block 325. Upon determining that the vehicle 100 is being operated autonomously, the process 300 proceeds to a block 335. Upon determining that the vehicle 100 is not being operated autonomously, the process 300 proceeds to the decision block 340.

In the block 335, the computer 105 actuates the second component of the vehicle 100, as described above. After the block 335, the process 300 proceeds to the decision block 340.

In the decision block 340, the computer 105 determines whether the vehicle 100 is on. If the vehicle 100 is still on, the process 300 returns to the block 305 to continue monitoring for the trigger condition and autonomous operation. If the vehicle 100 has been turned off, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive operation data generated by first components of a vehicle, the operation data indicating motion of the vehicle or a relationship of the vehicle to an external environment;
   determine that the vehicle is being operated autonomously by an on-board autonomous-operation module based on the operation data without using output from the on-board autonomous-operation module; and
   upon determining that the vehicle is being operated autonomously, actuate a second component of the vehicle.

2. The computer of claim 1, wherein determining that the vehicle is being operated autonomously includes executing a machine-learning classifier.

3. The computer of claim 2, wherein the machine-learning classifier is trained to classify the operation data as one of a plurality of operation classifications, and the operation classifications include at least one autonomous-operation classification and at least one nonautonomous-operation classification.

4. The computer of claim 2, wherein the machine-learning classifier is trained with training data including first operation data generated while operating vehicles using at least one first autonomous-operation module and second operation data generated while nonautonomously operating the vehicles.

5. The computer of claim 4, wherein the first operation data and the second operation data are generated while operating the vehicles over a same environment.

6. The computer of claim 4, wherein the training data includes third operation data generated while operating the vehicles using a second autonomous-operation module.

7. The computer of claim 1, wherein determining that the vehicle is being operated autonomously is conditional on determining that a trigger condition is met.

8. The computer of claim 7, wherein the trigger condition includes an indicator of an operator of the vehicle being distracted.

9. The computer of claim 7, wherein the trigger condition includes a lack of an indicator of an operator being distracted at the same time as the operator providing an input to the vehicle, and providing the input is correlated with the operator being distracted.

10. The computer of claim 7, wherein the trigger condition includes a first indicator of an operator being distracted and a lack of a second indicator of the operator being distracted.

11. The computer of claim 7, wherein the trigger condition includes the vehicle being at a preset geographic location.

12. The computer of claim 7, wherein the trigger condition includes an environmental condition being experienced by the vehicle.

13. The computer of claim 7, wherein the trigger condition includes a preset response to a prompt to an operator.

14. The computer of claim 1, wherein the first components include at least one of a propulsion system, a brake system, or a steering system.

15. The computer of claim 1, wherein the first components include at least one sensor that returns data about the external environment around the vehicle.

16. The computer of claim 1, wherein the operation data includes data transmitted over a communications network of the vehicle.

17. The computer of claim 1, wherein actuating the second component includes instructing a user interface to output a message to an operator of the vehicle.

18. The computer of claim 1, wherein actuating the second component includes inhibiting an input stream from the on-board autonomous-operation module.

19. The computer of claim 1, wherein actuating the second component includes instructing a transceiver to transmit the operation data to a remote server.

20. A method comprising:
receiving operation data generated by first components of a vehicle, the operation data indicating motion of the vehicle or a relationship of the vehicle to an external environment;
determining that the vehicle is being operated autonomously by an on-board autonomous-operation module based on the operation data without using output from the on-board autonomous-operation module; and
upon determining that the vehicle is being operated autonomously, actuating a second component of the vehicle.

* * * * *